(12) United States Patent
Gilpatrick et al.

(10) Patent No.: US 6,467,806 B2
(45) Date of Patent: Oct. 22, 2002

(54) AIRBAG STRUCTURE

(75) Inventors: Michael W. Gilpatrick, Chesnee; Charles E. Willbanks, Spartanburg, both of SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/846,585

(22) Filed: May 1, 2001

(65) Prior Publication Data

US 2001/0028166 A1 Oct. 11, 2001

Related U.S. Application Data

(63) Continuation-in-part of application No. 09/167,060, filed on Oct. 6, 1998, now Pat. No. 6,402,187.

(51) Int. Cl.[7] .............................................. B60R 21/16
(52) U.S. Cl. .................................................... 280/743.1
(58) Field of Search ........................... 280/728.1, 743.1

(56) References Cited

U.S. PATENT DOCUMENTS

| | | | |
|---|---|---|---|
| 3,792,873 A | 2/1974 | Buchner et al. | 280/150 |
| 3,814,141 A | 6/1974 | Iribe et al. | 139/127 |
| 4,005,233 A | 1/1977 | Dritt et al. | 428/35 |
| 4,631,101 A | 12/1986 | Rix | 156/175 |
| 4,863,660 A | 9/1989 | Cahuzac et al. | 264/103 |
| 4,921,735 A | 5/1990 | Bloch | 428/34.9 |
| 4,944,529 A | 7/1990 | Backhaus | 280/743 |
| 5,073,418 A | 12/1991 | Thornton et al. | 428/34.9 |
| 5,087,071 A | 2/1992 | Wallner et al. | 280/743 |
| 5,090,729 A | 2/1992 | Watanbe | 280/743 |
| 5,093,163 A | 3/1992 | Krummheuer et al. | 428/35.1 |
| 5,110,666 A | 5/1992 | Menzel et al. | 428/196 |
| 5,236,775 A | 8/1993 | Swoboda et al. | 428/225 |
| 5,259,645 A | 11/1993 | Hirabayashi et al. | 280/743 |
| 5,277,230 A | 1/1994 | Sollars, Jr. | 139/389 |
| 5,302,432 A | 4/1994 | Shigeta et al. | 428/36.1 |
| 5,310,216 A | 5/1994 | Wehner et al. | 280/743 |
| 5,316,337 A | 5/1994 | Yamaji et al. | 280/743 |
| 5,423,273 A | 6/1995 | Hawthorn et al. | 112/441 |
| 5,454,594 A | 10/1995 | Krickl | 280/743.1 |
| 5,470,106 A | 11/1995 | Nishimura et al. | 280/743.1 |
| 5,477,890 A | 12/1995 | Krummheuer et al. | 139/291 |
| 5,482,317 A | 1/1996 | Nelsen et al. | 280/743.1 |
| 5,503,197 A | 4/1996 | Bower et al. | 139/435.1 |
| 5,520,414 A | 5/1996 | Bishop | 280/743.1 |
| 5,540,965 A | 7/1996 | Nishimura et al. | 428/36.1 |
| 5,704,402 A | 1/1998 | Bowen et al. | 139/389 |
| 5,836,611 A | 11/1998 | Palm | 280/743.1 |

FOREIGN PATENT DOCUMENTS

| | | |
|---|---|---|
| EP | 0 992 402 | 12/2001 |
| JP | 3-97949 | 4/1991 |
| JP | 3-213446 | 9/1991 |
| JP | 3-227751 | 10/1991 |

(List continued on next page.)

*Primary Examiner*—Paul N. Dickson
*Assistant Examiner*—Tony Winner
(74) *Attorney, Agent, or Firm*—Terry T. Moyer; Daniel R. Alexander (57) ABSTRACT

A strong lightweight airbag cushion for deployment in opposing relation to a vehicle occupant and the method of making same. The cushion is formed from a body of wound yarn. The body includes an interior, a face portion for contact with the occupant and a rear portion including an inlet port for the introduction of an inflation medium. The body is formed by the continuous winding of yarn around a mandrel such that the yarn is spread across the face and is disposed preferentially across the back in the area surrounding the inlet port so as to provide added strength in the region adjacent the port that is located at a radial distance greater than the radius of said port. This is accomplished by shifting or shogging the yarn supplying mechanism relative to the cushion mandrel.

22 Claims, 7 Drawing Sheets

FOREIGN PATENT DOCUMENTS

| | | | |
|---|---|---|---|
| JP | 3-273958 | | 12/1991 |
| JP | 3-276845 | | 12/1991 |
| JP | 4-2538 | * | 1/1992 |
| JP | 4-2539 | | 1/1992 |
| JP | 4-15142 | * | 1/1992 |
| JP | 4-15143 | | 1/1992 |
| JP | 4-15144 | | 1/1992 |
| JP | 4-19251 | | 1/1992 |
| JP | 4-24143 | | 1/1992 |
| JP | 4-46838 | | 2/1992 |
| JP | 4-46839 | | 2/1992 |
| JP | 4-46840 | * | 2/1992 |
| JP | 4-90941 | | 3/1992 |
| WO | WO 97/37874 | | 10/1997 |

* cited by examiner

AIRBAG STRUCTURE

CROSS-REFERENCE TO RELATED APPLICATION

This application is a continuation-in-part of prior U.S. patent application Ser. No. 09/167,060, filed on Oct. 6, 1998, now U.S. Pat. No. 6,402,187, issued Jun. 11, 2002.

FIELD OF THE INVENTION

The present invention relates to inflatable protective cushions, and more specifically relates to a cushion formed by the highly efficient continuous winding of yarn. The cushion is particularly useful in the frontal or side protection of occupants in a transportation vehicle, such as an automotive vehicle, railroad, car, airplane, or the like. A process for forming the cushion and an optimum shape for the cushion according to the present invention are also provided.

BACKGROUND

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filling the cushion to a deployed state which can absorb the impact of the forward movement of a body and dissipate its energy by means of rapid venting of the gas. The entire sequence of events occurs within about 30 milliseconds. In the un-deployed state, the cushion is most commonly stored in or near the steering column, the dashboard, in a door panel, or in the back of a front seat placing the cushion in close proximity to the person or object it is to protect.

Inflatable cushion systems commonly referred to as airbag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple sewn configuration. Typically, traditional driver's side inflatable cushions have been formed by sewing together two circular pieces of coated fabric made of nylon or polyester yarn.

Although such sewn products have generally performed quite adequately, they nonetheless have some inherent limitations. First, the sewn seam is generally applied or at least inspected manually. As will be appreciated, this is a relatively time consuming process which tends to increase manufacturing costs. Second, circular and elliptical cushions formed by sewing around the perimeter are prone to wrinkles which may result in high and low stress concentrations thereby reducing the maximum inflation pressure which can be maintained at the seam. Third, the introduction of a sewn seam necessarily gives rise to small openings for the sewing threads. These openings tend to act as an escape path for the inflation gases within the airbag which may lead to seam slippage or so called "combing" of the seam thereby giving rise to a potential mechanism for failure. Fourth, even after the two disk shaped components are sewn together, the area surrounding the gas introduction port (i.e. the mouth) must generally be reinforced with additional layers of fabric referred to as doublers so as to control the large forces applied in this area during an inflation event. As will be appreciated, the addition of these doublers gives rise to additional manual processing and the need for additional fabric. Finally, the use of substantially circular shapes results in substantial material waste during manufacturing due to the inherent inability of the manufacturer to cut disk patterns in close-packed spacing arrangement.

Various alternative sewn constructions have been proposed such as those disclosed in U.S. Pat. No. 5,482,317 to Nelsen et al; U.S. Pat. No. 5,520,416 to Bishop; U.S. Pat. No. 5,454,594 to Krickl; U.S. Pat. No. 5,423,273 to Hawthorn et al; U.S. Pat. No. 5,316,337 to Yamaji et al; U.S. Pat. No. 5,310,216 to Wehner et al; U.S. Pat. No. 5,090,729 to Watanabe; U.S. Pat. No. 5,087,071 to Wallner et al.; U.S. Pat. No. 4,944,529 to Buckhaus; and U.S. Pat. No. 3,792,873 to Buchner (all incorporated herein by reference). However, these constructions each rely on some seaming of precut fabric panels and thus exhibit some if not all of the limitations outlined above.

The manufacture of airbag cushions by means of winding yarns and tape-like materials around a mandrel has been proposed in several publications including Japan Kokai Patent document 3-227751 in the name of Kanuma and Japan Kokai Patent document 3-276845 in the name of Ogami et al. (both incorporated herein by reference).

While these referenced publications recognize many of the limitations inherent in traditional sewn airbags, and have broadly proposed the use of winding technology as a means to avoid those limitations, they nonetheless fail to provide a highly efficient practice for the proper distribution of yarn. Rather, the prior art in this area has relied generally upon the winding of broad, tape like structures or of a relatively large number of parallel yarns to achieve the substantially complete coverage of the cushion surface area. The prior art also fails to teach the ability to preferentially distribute yarns in the area surrounding the inlet opening by shogging so as to provide additional support in this area thereby substantially reducing or eliminating the need for the application of an additional reinforcement in this region.

The airbag according to the present invention is formed from yarn which is substantially evenly distributed across the face of the cushion thereby avoiding the accumulation of yarn and the ultimate development of a nodule of undue thickness at the center of the cushion where impact with an occupant is likely to occur. In addition, the yarn is disposed in such a manner that a thickened ring of yarn is built up around and adjacent the inflation opening thereby enhancing the strength of the cushion at the very location where reinforcement is generally required. The airbag according to the present invention thus provides a useful advancement over the present art.

SUMMARY OF THE INVENTION

In view of the foregoing, it is a general object of at the present invention to provide an easily manufactured seamless airbag cushion.

It is a more particular object of the invention to provide a seamless airbag cushion formed by the winding of yarn about a removable mandrel such that the yarn is substantially evenly distributed across the face of the cushion.

It is a further object of the present invention to provide a seamless airbag cushion formed by the winding of yarn about a removable mandrel such that the yarn is disposed preferentially across the back of the cushion in the area surrounding the inlet port so as to form a localized region of enhanced thickness to provide additional strength in that region surrounding and adjacent the inlet port.

It is a further potential object of the present invention to provide a seamless airbag cushion formed by the winding of yarn about a removable rotating mandrel wherein the cushion includes a flexible permeability blocking layer of material holding the yarn in place.

An additional object of the invention is to provide a low cost inflatable protective cushion of simple and structurally efficient design with a shape and construction that optimizes the cushion's ability to withstand inflation pressure and impact when deployed.

It is a preferred feature of the present invention to provide a seamless airbag cushion formed by the winding of a yarn in a continuous fashion around a generally spheroidal rotating mandrel while systematically shifting or shogging the angle of placement of the yarn with respect to the axis of rotation of the mandrel about a point near the mouth of the bag structure being formed such that a localized region of enhanced thickness is formed around the mouth opening a pre-determined distance therefrom.

It is yet a further potentially preferred feature of the present invention to provide a seamless airbag cushion formed by the winding of a yarn in a continuous fashion around a generally spheroidal rotating mandrel having a shape substantially similar to the desired shape of the finished cushion wherein the ratio of the depth of the cushion to its equatorial diameter is about 0.5 to 0.7.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the written description and claims as well as the appended drawings.

It is to be understood that both the foregoing general description and the following detailed description are exemplary and explanatory only and are not restrictive of the invention, as claimed.

BRIEF DESCRIPTION OF THE DRAWINGS

The accompanying drawings which are incorporated in and constitute a part of this specification, serve to illustrate several preferred embodiments and practices according to the present invention and together with the description, serve to explain the principles of the invention wherein.

DESCRIPTION OF PREFERRED EMBODIMENTS

Reference will now be made in detail to potentially preferred embodiments and practices. It is, however, to be understood that reference to any such embodiments and practices is in no way intended to limit the invention thereto. On the contrary, it is intended by the applicants to cover all alternatives, modifications and equivalents as may be included within the spirit and scope of the invention as defined by the appended claims.

Airbags may be produced from a number of different materials using a multiplicity of techniques. However, commercially acceptable airbags have heretofore typically been formed, at least in part, from some type of woven textile material. By way of example only and not limitation, such textile materials are disclosed in U.S. Pat. No. 5,503,197 to Bower et al.; U.S. Pat. No. 5,477,890 to Krummheuer et al.; U.S. Pat. No. 5,277,230 to Sollars, Jr.; U.S. Pat. No. 5,259,645 to Hirabayashi, et al.; U.S. Pat. No. 5,110,666 to Menzel et al.; U.S. Pat. No. 5,093,163 to Krummheuer et al.; U.S. Pat. No. 5,073,418 to Thornton et al.; U.S. Pat. No. 4,921,735 to Bloch; and U.S. Pat. No. 3,814,141 to Iribe et al; (all incorporated herein by reference).

Figure 1A:
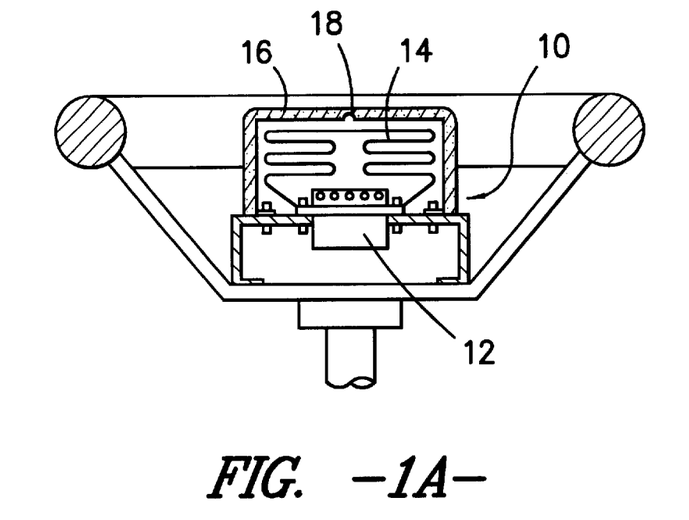
FIG. 1A is a cutaway view of an inflatable cushion according to the present invention and inflation module housed within the steering column of a vehicle.
Figure 1B:
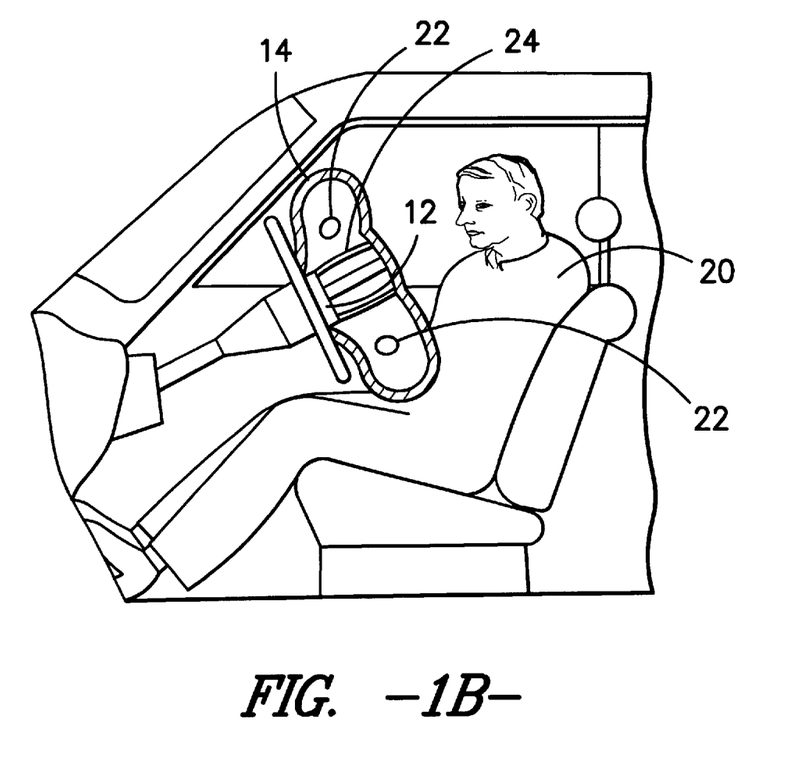
FIG. 1B illustrates a cutaway view of an inflatable cushion according to the present invention in deployment between a passenger and the steering column.

A typical airbag deployment system 10 for use in opposing relation to the driver of a vehicle is illustrated in FIG. 1A. In general, similar equipment is used in passenger and side protection devices, although the geometry of the components therein may vary. The airbag deployment system 10 generally comprises an inflator 12, an inflatable cushion 14 which includes a mouth portion surrounding the inflator 12 thereby permitting the cushion to be inflated by gas released from the inflator during a collision event. The cushion 14 and inflator 12 are typically housed beneath a frangible cover 16 which breaks open along a notch 18 of reduced thickness during the deployment event. As illustrated in FIG. 1B, upon deployment the cushion 14 is in a position to receive a vehicle occupant 20. As will be appreciated, the kinetic energy of the occupant 20 is dissipated by the collapse of the cushion 14 as gas is released either through inherent permeability of the material forming the cushion 14 and/or through internal pressure sensitive vents 22. The cushion 14 may further include shape controlling tethers 24 which require the cushion to expand to a pre-determined desirable geometry upon inflation.

Figure 2:
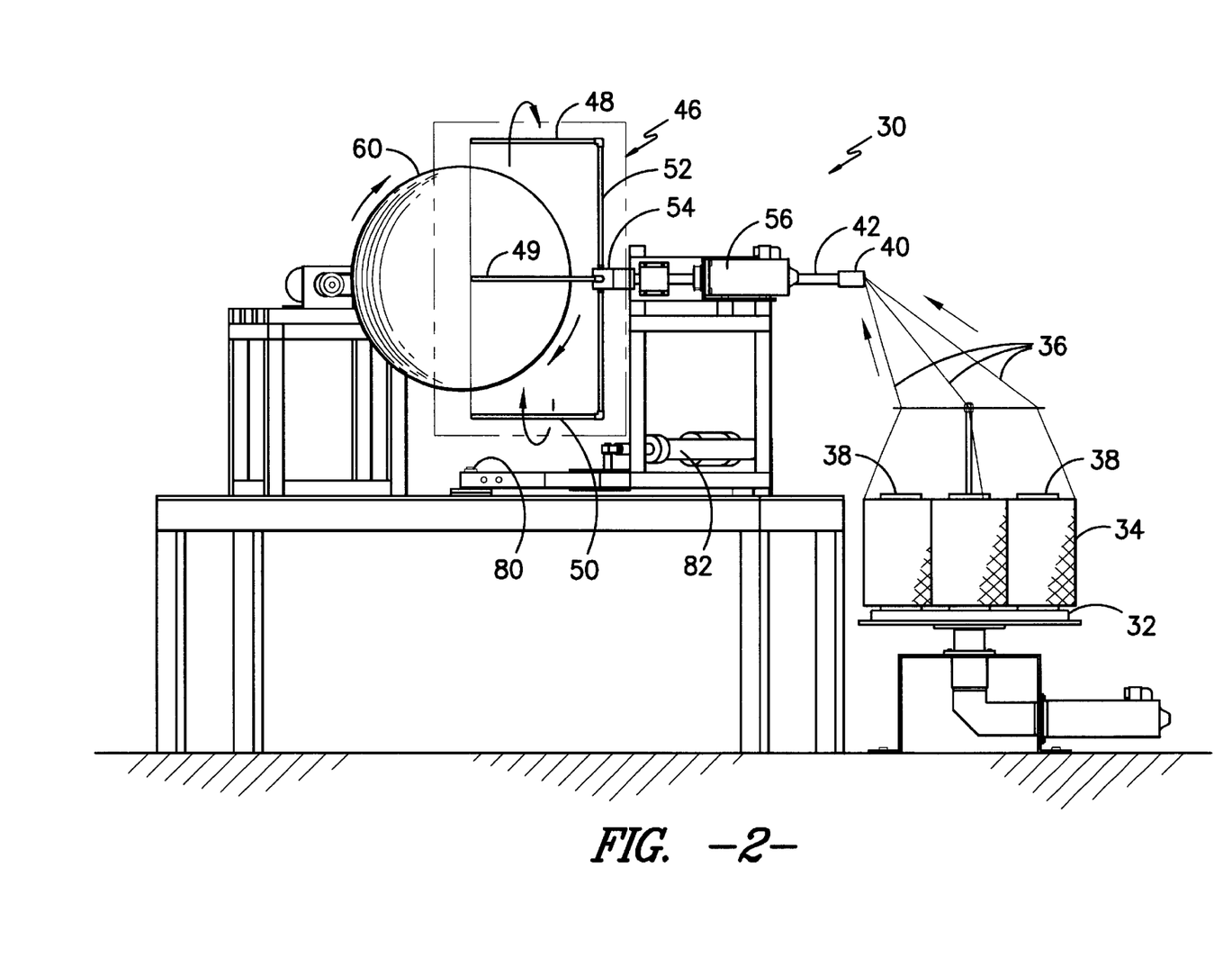
FIG. 2 illustrates the yarn winding operation for forming the airbag according to the present invention.

In FIG. 2 a side view of the apparatus 30 for carrying out the yarn winding operation according to the present invention is illustrated. As shown, the apparatus 30 preferably includes a rotatable platform 32 for holding one or more packages 34 of yarn 36 for use in formation of the airbag according to the present invention. The yarn 36 is preferably wrapped around a spool 38 such that the yarn may be removed in a continuous fashion without the occurrence of tangling. While multiple packages 34 are illustrated, it is to be understood that the present invention does not require the delivery of more than one continuous yarn 36 in order to achieve effective bag formation. When the operation is carried out with a single continuous yarn, the use of multiple packages has the advantage of avoiding frequent package replacement since the packages are already in place.

While the invention contemplates the use of a single yarn in the winding operation, it is likewise contemplated that two or more yarns 36 may be delivered and wrapped simultaneously in substantially side by side relation to one another during the winding operation. It is further contemplated that the yarns 36 and each of the packages 34 may be either of the same or of a different character. Thus, if an individual yarn 36 is to be wound according to the present invention the initial stages of the winding operation may be carried out using one type of yarn while the latter stages may be carried out using yarn of differing character. Likewise if two or more yarns 36 are to be wound simultaneously, it is contemplated that these yarns may be either of the same or differing character. As will be appreciated this ability to select combinations of yarns having different character may be of value in exploiting the benefits of various different yarn combinations within the structure to be formed.

In the illustrated and potential preferred practice, the yarn 36 is delivered to a central eye 40 for subsequent transmission through a tubular guide path 42 for eventual delivery through a balanced hollow arm rotating winding apparatus 46.

The winding apparatus 46 is preferably a symmetrical structure having at least two yarn delivery arms 48,50 extending outwardly from either end of an elongated support shaft the center of which preferably serves as the axis of rotation for the winding apparatus 46. As shown, the winding apparatus may also include one or more additional arms 49 preferably disposed in balanced relation to the other arms. In one potentially preferred embodiment, the winding apparatus will have four hollow symmetrically disposed yarn delivery arms each of which deliver a separate yarn 36 from a separate package 34.

In the preferred embodiment, the winding apparatus 46 is preferably rotated about the axis of rotation 54 by means of a variable speed motor 56 controlled by a computer (not shown) or other control means as are known to those of skill in the art such that the rate of winding and number of revolutions may be present and closely monitored during the winding operation.

The yarn 36 which is delivered through the hollow winding apparatus to the end of at least one of the yarn delivery arms is initially secured in place against a collapsible mandrel 60 by either a small piece of adhesive tape or by mannually wrapping one or two loops around the mandrel such that frictional forces prevent the yarn from pulling away. Thereafter, the mandrel 60 is rotated by means of its own independent variable speed motor 62 (FIG.3) while simultaneously rotating the winding apparatus 46 such that the yarn 36 is continuously drawn from the winding apparatus around the mandrel. As will be appreciated, by controlling the rotation of both the mandrel 60 and the winding apparatus 46, substantial control can be exerted over the final yarn distribution.

The mandrel 60 is preferably covered at least in part by a thin releasable film of a material such as PVC, polyurethane, or the like to permit separation of the yarns 36 from the mandrel 60 following application of a permeability blocking coating layer as described below. In one particularly preferred embodiment, the releasable film is disposed across the surface of the mandrel 60 corresponding to the front of the cushion 14 against which the occupant 20 would be thrown, while the rear surface is wound without a release layer. This practice provides the dual advantage of minimizing the amount of release film utilized while at the same time providing an added barrier layer between the occupant and the inflation gases which are generally hot and may carry particulets.

Figure 3:
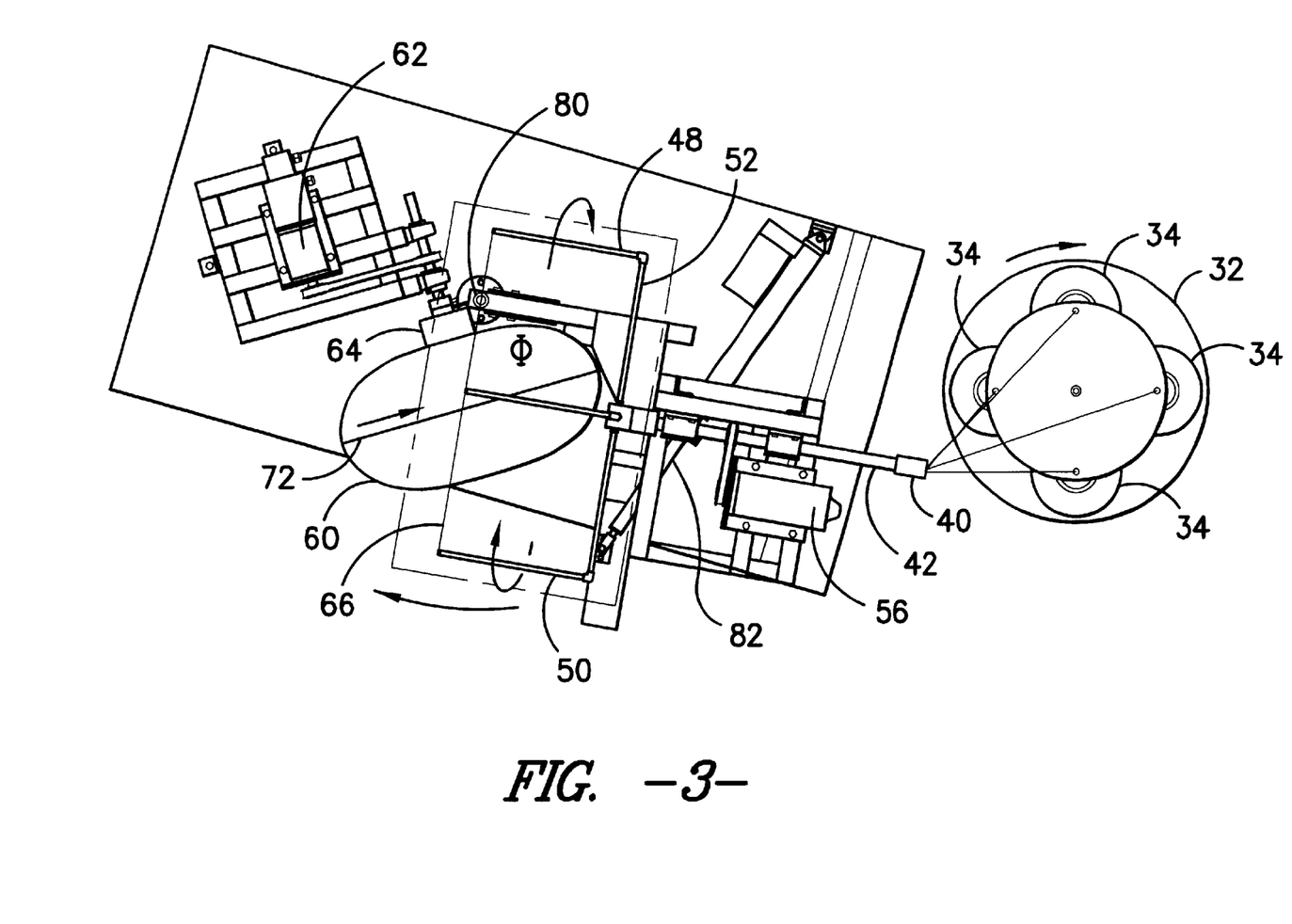
FIGS. 3–5 are plan views of the airbag winding operation carried out according to the potentially preferred practice of the present invention.
Figure 4:
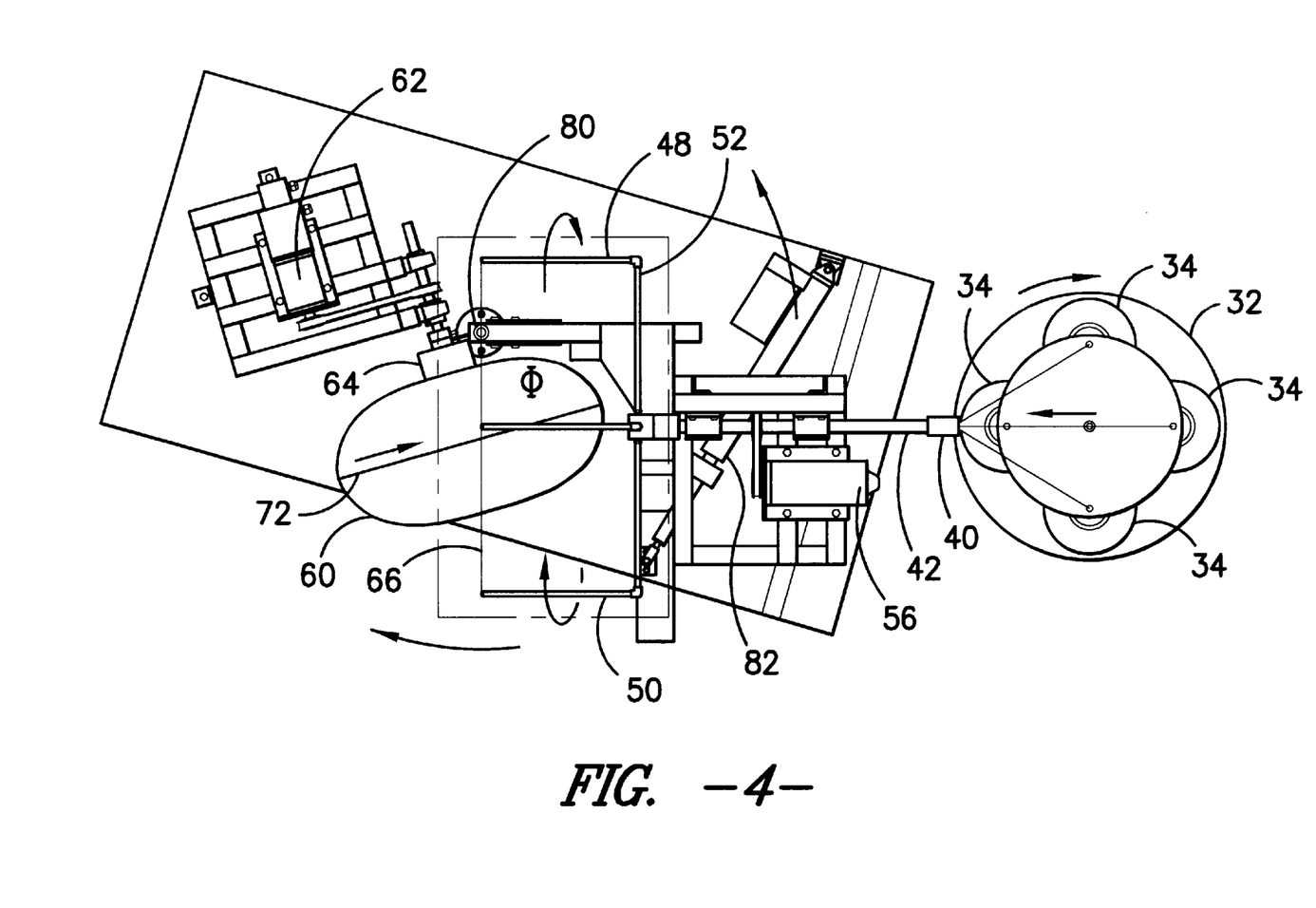
Figure 5:
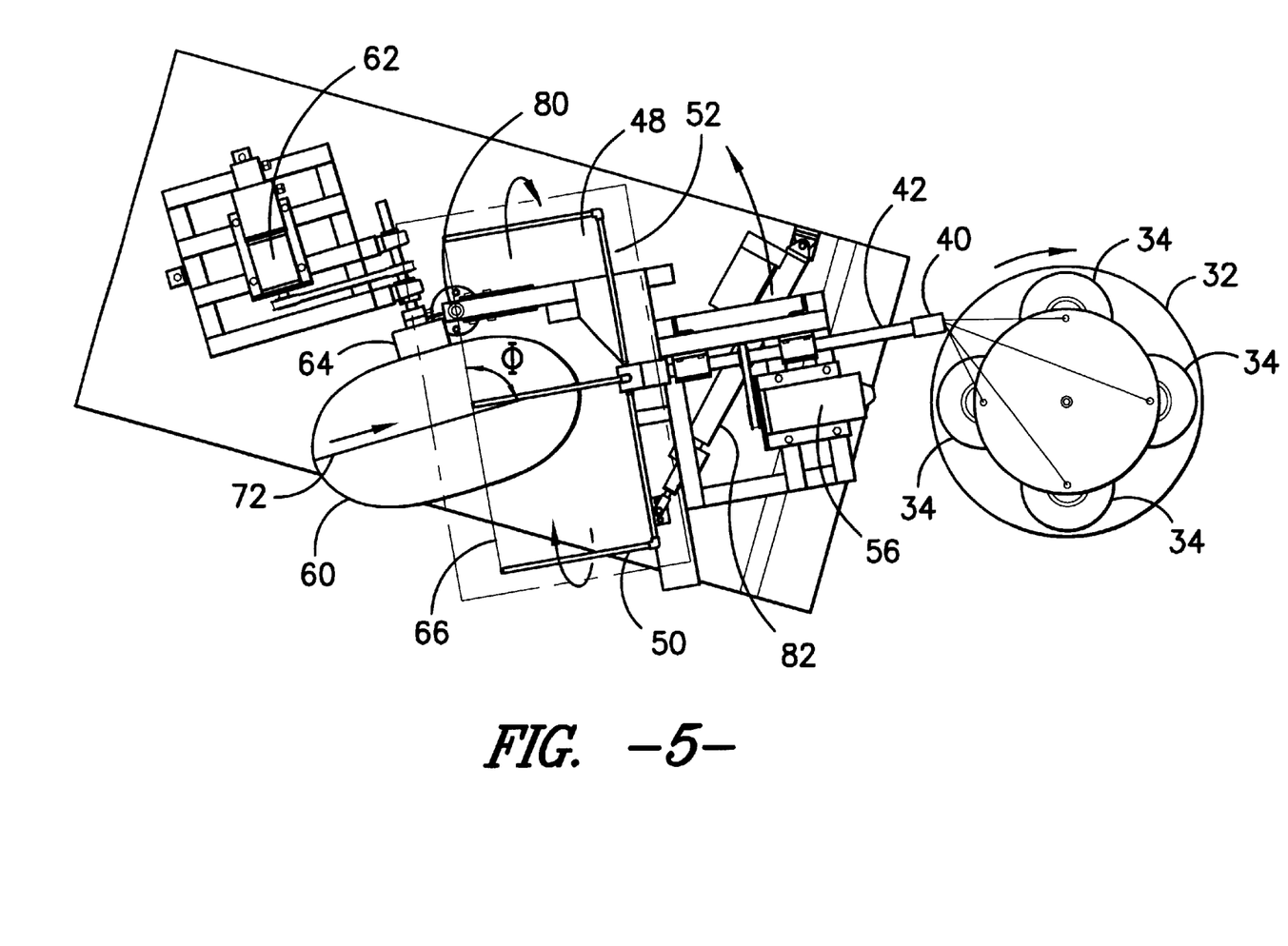

As best illustrated in FIGS. 3–5, the mandrel 60 is preferably of a shape substantially corresponding to the final desired shape of the airbag cushion being formed. While any shape susceptible to rotation and yarn coverage may be utilized, it is contemplated that circular and ellipsoidal spheroids may be particularly preferred for driver's side airbag cushions.

The mandrel 60 itself is necessarily of such a nature that it can be removed from the final airbag structure after formation is complete. Materials which may be particularly well suited to this purpose include sculpted foam rubber, collapsible segmented metal structures, and durable textile structures formed from material such as KEVLAR® or the like which may be held in an inflated state under modest gas pressures through connection to an air line during the processing sequence. As shown, the mandrel 60 is preferably connected to a hub 64 disposed along its axis of rotation. In the illustrated and potentially preferred practice, the placement and diameter of the hub 64 defines the size and location of the inlet port in the final airbag cushion.

As will be appreciated by those in skill of the art, the region surrounding the inlet port serves as the location of connection between the inflatable cushion 14 and the inflator 12 (FIG. 1A) and must, therefore, withstand significant stress during a deployment event. These stresses can be overcome by providing enhanced thickness of the cushion in this localized region.

Figure 6A:
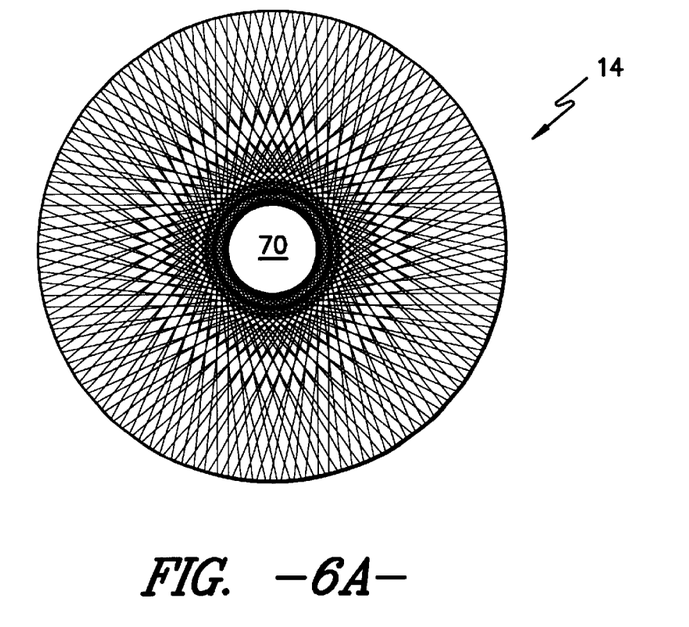
FIGS. 6A and 6B are, respectively, elevation views of the rear and front of an airbag cushion formed according to the potentially preferred practice of the present invention.
Figure 6B:
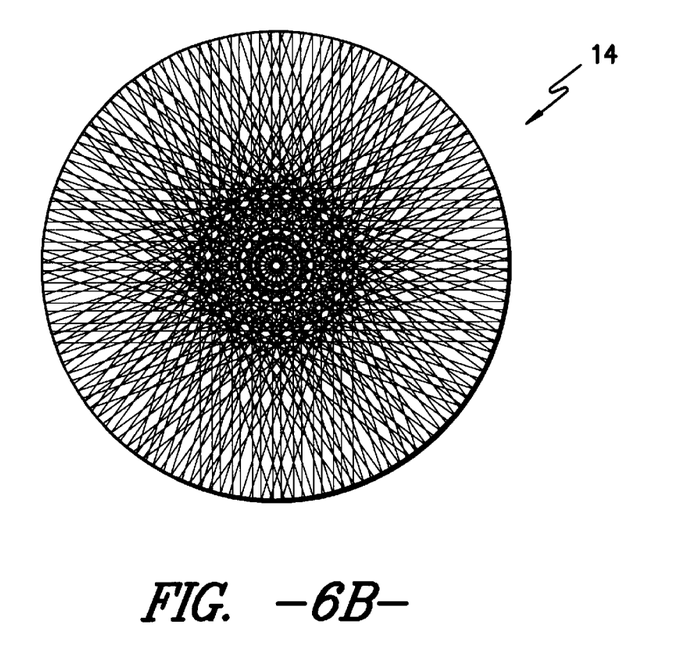

It has been found that by orienting the mandrel 60 relative to the winding apparatus 46 such that the yarn placement plane 66 (as defined by the outlet of the yarn delivery arms) runs immediately adjacent to the hub 64, that it is possible to obtain the desired increased thickness in the region surrounding the mouth at a distance therefrom with gradually decreasing yarn concentration as the distance from the mouth is increased. This preferential yarn concentration is illustrated in FIG. 6A wherein the gas inlet 70 disposed within the rear portion of the cushion 14 is surrounded by a relatively thick collar of material which decreases in concentration as the distance from the center is increased. That is, the number of yarns per unit area decreases as the perimeter of the cushion is approached.

Figure 7:
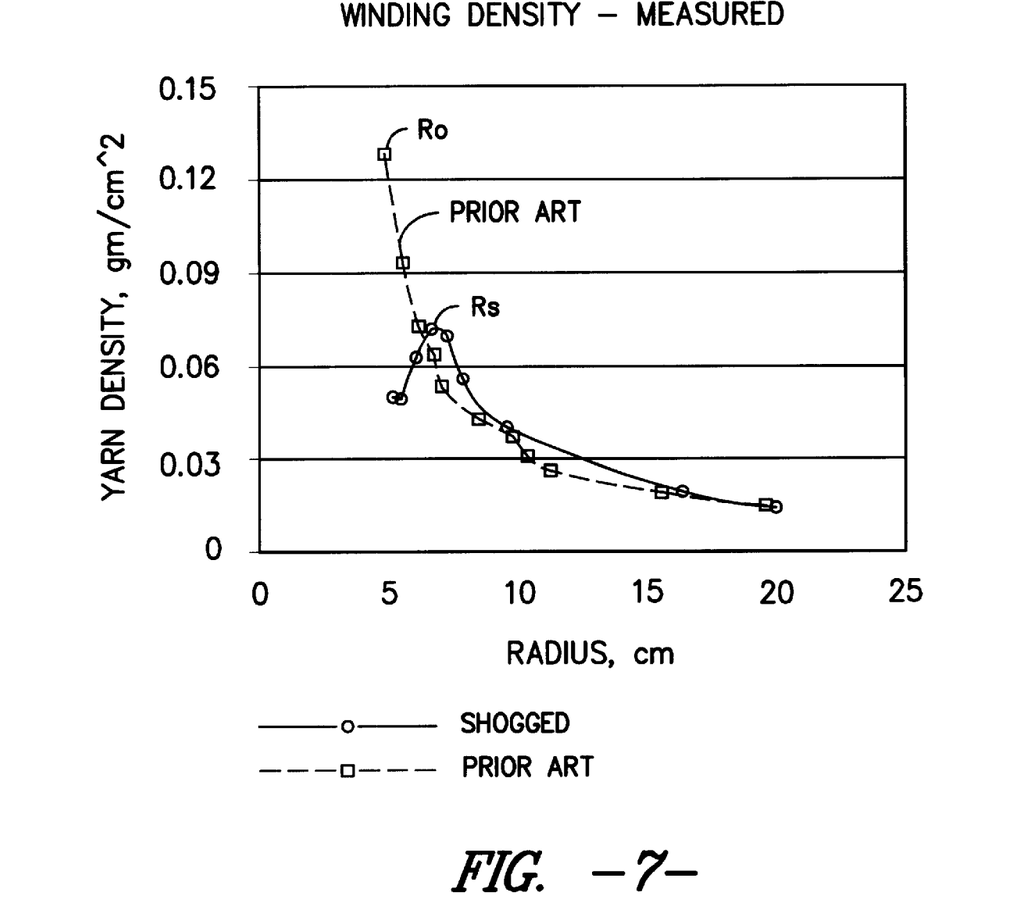
FIG. 7 is a graphical view showing the actual variation of the yarn density adjacent the hub opening of the airbag for the prior art and the instant invention.

Aside from the desire to enhance the strength of the cushion in the area surrounding the inlet port 70, it is a further attribute of the cushion according to the present invention to avoid a preferential accumulation of yarns at the face of the inflatable cushion since such a build up gives rise to the formation of a generally undesirable hard nodule on the surface which is to be impacted by the vehicle occupant 20 during a collision event. It has been found that when the yarn 36 is wrapped around the rotating mandrel 60 while maintaining a fixed angle Φ between the yarn placement plane 66 (FIG. 3) and the equatorial plane 72 of the mandrel, that each winding tends to cross over the prior windings within a relatively small localized location on the face of the inflatable cushion 14 which thereby causes the undesirable build-up of a thick nodule of yarn, 7, in this location on the face. Such a build-up of yarn is, of course, exactly what is desired in the region surrounding the inlet port 70 on the rear portion of the cushion 14 designated as Ro in FIG. 7.

It has been found that these seemingly conflicting goals of concentrating the yarn around the inlet port on the rear of the cushion while at the same time spreading the yarn substantially evenly across the face may be achieved by systematically shifting or shogging the angle of the yarn placement plane 66 with respect to the equatorial plane 72 of the rotating mandrel 60 about a pivot point selected such that the yarn placement plane 66 continues to fall substantially adjacent to the hub 64 on the rear portion of the rotating mandrel 60. This systematic shifting of the yarn placement angle is best illustrated through reference to FIGS. 3–5, 6A and 7 wherein in FIG. 3 the yarn placement plane 66 is at a first angle Φ with respect to the equatorial plane 72 of the mandrel. In FIGS. 4 and 5 this angle is gradually increased until the two planes are nearly perpendicular.

In the illustrated and potentially preferred practice of the present invention, shifting or shogging of the yarn placement plane is effected by pivoting the winding apparatus 46 about a pivot 80 (FIGS. 2–5) through use of an extensible and retractable power cylinder 82 acting on the support for the winding apparatus. In the illustrated and potentially preferred practice, the pivot 80 is placed such that its center is aligned just outside the outer perimeter of the hub 64 which serves to define the inlet port 70. As the power cylinder 82 is retracted from its fully extended position in FIG. 3 throught an intermediate position in FIG. 4 to a fully retracted position in FIG. 5, the yarn placement on the front of the mandrel 60 is substantially changed. However, due to the selection of the pivot point location, the yarn placement of the rear of the mandrel is not significantly altered. Thus, the seemingly contradictory need to concentrate yarn around the inlet port while simultaneously spreading yarn across the face can be met. Moreover, since the power cyclinder 82 may be cycled by the computer or other control means independently from the rotation of the mandrel and the winding apparatus, the pivoting action provides the operator with yet another degree of freedom with which to control the manufacturing process. It should be noted the maximum density build-up Rs occurs at a radius greater than the minimum radius of the hub Ro. See FIG. 7 wherein it is shown that the yarn density Rs is located at a minimum radial distance from the hub opening of about 5% greater than the hub radius.

While it is contemplated that a wide variety of combinations of operating parameters may be utilized to produce inflatable restraint cushions according to the present invention, by way of example only, and not limitation, it is believed that in the preferred practice the mandrel 60 should be rotated at a rate of about 0.05 to about 30.0 revolutions per minute, the winding apparatus should be operated at a rate of about 50 to about 600 revolutions per minute, the angle between the yarn placement plane 66 and the equatorial plane 72 should be cycled between about 46° and about 90° with about 1 to about 20 full cycles of extension and retraction of the power cylinder 82 per minute.

While it is likewise contemplated that any number of different types of yarns 36 may be utilized, it is believed spun or filament polymeric yarns formed fiber materials such as polyester, nylon 6, nylon 6.6, nylon 4.6, KEVLAR®, and SPECTRA® characterized by yarn linear densities in the range of about 40 to 1200 denier (preferably about 70 to 200 denier) and filament linear densities in the range of about 2 to 6 denier per filament (preferably 3 to 5 denier per filament) may be preferred. The average yarn concentration as measured by dividing the total mass of yarn utilized in a given bag by the surface area for that bag includes regions of both low and high yarn concentration is preferably in the range of about 50 to 300 grams per m$^2$.

As will be appreciated, in some instances, the concentration of yarn itself may not be sufficient to block air flow. In addition, the release film which is carried with the cushion is preferably of a very light weight character and may not provide complete porosity blocking performance. Moreover such release films may be completely absent if the mandrel is of such a nature that a release layer is unnecessary. By way of example only, it is contemplated that a mandrel formed of a textile material coated with Teflon, silicone or other adhesion resistant material may make the use of a release layer unnecessary. Accordingly, in one potentially preferred practice it is desirable to apply a porosity blocking coating of material across the wound yarn structure so as to hold the yarn in place and to provide containment for the gaseous inflation media generated during an expansion event. While any number of coating materials may be utilized, it is required that such material be flexible in nature such that it can span the voids between the yarns without failing under pressure. It is believed that thermoplastic or thermosetting compositions of polyurethane, polyamide, polypropylene, PVC, acrylics, and mixtures of these materials may be useful. These materials may be applied by spray coating, knife coating, dip coating or other commercial processes as may be known to those of skill in the art. By way of example only, it is believed that the weight concentration of the elastomer in the final bag may be in the range of about 40 to 900 grams per m$^2$.

As previously indicated, aside from a fundamental formation technique, the present invention further contemplates a potentially preferred shape for the inflatable cushion 14 so as to optimize the strength characteristics of the load bearing yarns 36 within the structure. Hence, this optimized shape characteristic would be used in the design of the mandrel 60 for use in the winding procedure described above.

It is believed that the maximum strength of a composite material such as the wound airbag structure of the present invention is obtained when the strains in the individual components are matched. Thus, the optimum shape for maximum strength in the airbag of the present invention is obtained when there is uniform tension in the yarns. It has been discovered that the shape which results in uniform tension in the yarns is a geometric curve which can be characterized parametrically in cylindrical coordinates for one quadrant by the equations $$\frac{z}{a} = \int_0^\theta \frac{\left(\sin\left(\frac{\pi}{2} - u\right)\right)^{\left(\frac{1}{2}\right)}}{2} du$$

$$\frac{r}{a} = \sin\left(\frac{\pi}{2} - \theta\right)^{\frac{1}{2}}$$

$$0 \leq \theta \leq \frac{\pi}{2}$$

Where r is the radial coordinate and z is the axial coordinate. The radius at the equator is given by the equation:

$$a = \left[\frac{V}{2 \cdot \pi \cdot \int_0^{\frac{\pi}{2}} \sin\left(\frac{\pi}{2} - \theta\right) \cdot \frac{\left(\sin\left(\frac{\pi}{2} - \theta\right)\right)^{\left(\frac{1}{2}\right)}}{2} d\theta}\right]^{\frac{1}{3}}$$

or approximately $$a = .714 \cdot V^{\frac{1}{3}}$$

Where V is the desired volume of the bag at low inflation pressure.

The height to equatorial diameter (2a) ratio is:

$$\frac{2 \cdot h}{2 \cdot a} = \int_{-0}^{\frac{\pi}{2}} \frac{\left(\sin\left(\frac{\pi}{2} - u\right)\right)^{\left(\frac{1}{2}\right)}}{2} du$$

or approximately:

$$\frac{2 \cdot h}{2 \cdot a} = .599$$

It is believed that the benefit of this shape in providing uniform yarn tension is achievable in substantial respect so long as the radial coordinate of the shape is within about plus or minus ten percent of its ideal value in relation to the other coordinates.

The following working example is presented to provide a more complete understanding of the invention. The specific techniques, conditions, materials, and reported data should be understood to be exemplary only and should in no way be construed as in way limiting the scope of the invention which is intended to be defined and limited only by the full lawful scope of allowed claims and equivalents thereto.

EXAMPLE

An inflatable round spheroidal rotating mandrel formed of KEVLAR® reinforced nylon film having an equatorial diameter of 22 inches and a central depth of 11.75 inches was wrapped with a 1 mil thick film of PT9611 Polyurethane and inflated to a pressure of 1 psi and rotated at a rate of 0.322 revolutions per minute while a 112 denier multifilament yarn of polyester having a denier per filament rating of 3.4 was delivered by a winding arm at a rate of 240 revolutions per minute for a period of 15.5 minutes. During the winding operation, the angle between the plane of yarn placement and the equator of the mandrel was cycled from about 64.3 degrees to about 83.5 degrees and back every 0.134 minutes. The total mass of yarn delivered around the mandrel was 2.36 ounces over an area of 0.6836 square meters. An air line was used to maintain the mandrel in an inflated state during the winding operation. While still under inflation, the mandrel and yarns wrapped thereabout were coated with an aqueous base polyurethane composition. The dried add on weight of the coating composition was 63.4 grams for the entire structure. After drying, the sample was tested to failure by rapidly exposing it to air heated to 1000° F. A pressure of 19.4 psi was attained before the sample burst.

While specific preferred embodiments and materials have been illustrated, described and identified, it is to be understood that the invention is in no way limited thereto since modifications may be made and other embodiments of the invention will occur to those of skill in the art to which this invention pertains. Thus, it is intended to cover any such modifications and other embodiments ads incorporated the features of this invention within the full lawful scope of the allowed claims as follows.

What is claimed is:

1. A strong lightweight airbag cushion for deployment in opposing relation to a vehicle occupant during a collision event, the cushion comprising: a body of wound yarn including an interior, a face portion for contact with the vehicle occupant and a rear portion including an inlet port for the introduction of an inflation medium into the body, wherein the body is formed by windings of yarn is spread across said face portion of said body and such that the yarn is disposed preferentially across the back of said body in the area surrounding the inlet port so as to form a localized region of enhanced thickness defining a concentric annulus around the inlet and spaced a distance from said inlet port.

2. The airbag cushion of claim 1, wherein said distance is at least 5% of the radius of the inlet port.

3. The airbag cushion according to claim 1, wherein said body includes a flexible permeability blocking coating of material.

4. The airbag cushion according to claim 3, wherein said flexible permeability blocking coating of material is an elastomeric adhesive.

5. The airbag cushion according to claim 4, wherein said elastomeric adhesive is applied across the surface of said cushion in the form of a curable dispersion subsequent to the winding of said yarn around said mandrel.

6. The airbag cushion according to claim 1, further comprising a film disposed across at least a portion of the interior of said body.

7. The airbag cushion according to claim 6, wherein said film is disposed across at least a portion of the interior of said face portion of said body.

8. The airbag cushion according to claim 6, wherein said film is disposed across substantially the entire interior of said body.

9. The airbag cushion according to claim 6, wherein said film is a thin releasable film.

10. The airbag cushion according to claim 9, wherein said film is at least one of PVC, polypropylene, polyamide, and polyurethane.

11. The airbag cushion according to claim 1, wherein said windings comprise one yarn.

12. The airbag cushion according to claim 11, wherein said one yarn is a yarn formed from polymeric materials selected from the group consisting of polyester, Nylon 6, Nylon 6.6, Nylon 4.6 and blends thereof.

13. The airbag cushion according to claim 11, wherein said one yarn has a linear density in the range of about 40 to 400 denier.

14. The airbag according to claim 1, having a round spherodial shape.

15. The airbag cushion according to claim 1, further including a flexible, permeability blocking coating layer of elastomeric adhesive holding the yarn in place.

16. The airbag cushion according to claim 15, wherein said elastomeric adhesive is applied across the surface of said cushion in the form of a curable dispersion subsequent to the substantially continuous winding of yarn around said rotating mandrel.

17. The airbag cushion of claim 1 wherein the cushion has a round spheroidal shape wherein the ratio of depth to equatorial diameter is about 0.5 to 0.7.

18. The airbag cushion of claim 1, wherein at least some said yard crosses an equatorial plane between said face portion and said rear portion at an angle of between about 46° and about 90°.

19. The process of manufacturing a strong lightweight airbag cushion comprises the steps of: providing an inflated spheroidal rotating mandrel having a rotating collar, supplying yarn from a rotating arm onto said mandrel and varying back and forth the angle between the plane of yarn placement and the equatorial of the mandrel to provide an area of enhanced yarn density defining a concentric annulus around the rotating collar and spaced a distance from said collar.

20. The process of claim 19 wherein said angle was varied between 46° and 90°.

21. The process of claim 20 wherein said area of enhanced density is at least at a distance of about 5% of the radius of said collar from said collar.

22. The process of claim 19 wherein said area of enhanced density is at least at a distance of about 5% of the radius of said collar from said collar.

* * * * *

UNITED STATES PATENT AND TRADEMARK OFFICE
CERTIFICATE OF CORRECTION

| | | |
|---|---|---|
| PATENT NO. | : 6,467,806 B2 | Page 1 of 1 |
| DATED | : October 22, 2002 | |
| INVENTOR(S) | : Michael W. Gilpatrick and Charles E. Willbanks | |

It is certified that error appears in the above-identified patent and that said Letters Patent is hereby corrected as shown below:

Column 9,
Line 57, after the word "yarn" insert -- such that the yarn --.

Column 10,
Line 45, delete the word "yard" and insert -- yarn --.
Line 49, delete the word "comprises" and insert the word -- comprising --.

Signed and Sealed this

Fourteenth Day of October, 2003

JAMES E. ROGAN
*Director of the United States Patent and Trademark Office*